United States Patent [19]

Barada

[11] Patent Number: 4,953,388
[45] Date of Patent: Sep. 4, 1990

[54] AIR GAUGE SENSOR

[75] Inventor: Andrew H. Barada, New Canaan, Conn.

[73] Assignee: The Perkin-Elmer Corporation, Norwalk, Conn.

[21] Appl. No.: 301,088

[22] Filed: Jan. 25, 1989

[51] Int. Cl.$^5$ .............................................. G01B 13/12
[52] U.S. Cl. ...................................................... 73/37.5
[58] Field of Search ...................... 73/37.5, 37.6, 37.9, 73/37.8, 37.7

[56] References Cited

U.S. PATENT DOCUMENTS

| | | | |
|---|---|---|---|
| 2,589,251 | 3/1952 | Heinz | 73/37.5 |
| 2,986,924 | 6/1961 | Becker | 73/37.5 |
| 3,482,433 | 12/1969 | Gladwyn | 73/37.5 |
| 3,681,974 | 8/1972 | McLellan et al. | 73/37.5 |
| 4,090,406 | 5/1978 | Rodder | 73/37.5 X |
| 4,142,401 | 3/1979 | Wilson | 73/37.5 |
| 4,574,617 | 3/1986 | Hetznecker et al. | 73/37.9 |

FOREIGN PATENT DOCUMENTS

| | | | |
|---|---|---|---|
| 238803 | 3/1969 | U.S.S.R. | 73/37.8 |
| 659897 | 4/1979 | U.S.S.R. | 73/37.5 |

Primary Examiner—Hezron E. Williams
Assistant Examiner—Joseph W. Roskos
Attorney, Agent, or Firm—Paul A. Fattibene; Thomas P. Murphy; Edwin T. Grimes

[57] ABSTRACT

A pneumatic bridge air gauge sensor. A measurement leg and a reference leg are used to measure a gap between a measurement probe and a surface. The two legs are initially balanced resulting in no air flow therebetween. A mass air flow sensor coupled between the two legs detects the mass air flow between the two legs resulting from a change in the gap distance from the balanced state.

1 Claim, 1 Drawing Sheet

AIR GAUGE SENSOR

FIELD OF THE INVENTION

This invention relates generally to apparatus for detecting the distance from a surface, and more particularly to a balanced low flow pneumatic bridge for detecting small gaps with minimum influence on particulate contamination on the surface due to low volumetric air mass flow.

BACKGROUND OF THE INVENTION

In many automated mechanical operations it is often necessary to sense the distance to a surface or to maintain a fixed distance between two surfaces. In some applications this distance or gap that is to be sensed or maintained is very small, in the order of microns or millionths of a meter. One application where these gaps need to be detected or maintained is in lithographic systems such as those used in semiconductor manufacturing.

Typically, air gauges have been used applying the principles of a pressure difference between two balanced sides or legs. The deflection of a flexible membrane between the two legs is used to measure or maintain a gap or distance between two surfaces. One surface being a probe emitting the air and the other surface being the surface the distance from which is to be measured.

While these air gauges are acceptable for most applications, in some applications their performance is not adequate. For example, because the air gauges operate on a pressure difference the pressure change must be integrated over the volume of the air conduits resulting in a long response time. This response time, or frequency response, is in the order of 200-300 msec. Additionally, these air gauges operate at relatively high pressures resulting in high airflow increasing the liklihood of contamination. As technology advances, and in particular the lithographic arts as applied to semiconductor manufacturing, these response times limit system performance. Therefore, there exists a need to improve the response time of air gauges generally, and more specifically as applied to lithographic systems used in the manufacture of semiconductors.

SUMMARY OF THE INVENTION

The present invention is directed to a pneumatic bridge device for quickly and accurately detecting a small gap. A source of air under constant pressure is divided into two channels. A measurement channel and a reference channel. Both channels have a restrictor placed therein to accurately control the mass air flow through the channels. In each channel the air flow is again divided between a probe and a mass air flow sensor. At the distal end of the measurement channel a measurement probe is attached permitting air to exit between the measurement probe and a surface to be detected. Similarly, a reference probe is attached to the distal end of the reference channel permitting air to escape between the reference probe and a reference surface. The mass air flow sensor is connected between the measurement channel and the reference channel.

When the gap between the measurement probe and the surface to be detected and the gap between the reference probe and the reference surface is equal the pneumatic bridge will be balanced and no mass air flow will be detected between the channels by the mass air flow sensor. If the gap between the measurement probe and the surface to be detected changes the pneumatic bridge will be unbalanced and air will flow between the two channels and be detected by the mass air flow sensor.

Accordingly, it is an object of the present invention to quickly detect the movement of a surface with submicron accuracy.

It is another object of the present invention to provide an air gauge sensor that minimizes contamination to a surface or wafer.

It is a further object of the present invention to provide an air gauge sensor that has a construction that can easily be manufactured.

It is yet a further object of the present invention to provide an air gauge sensor that is interchangeable between systems with little recalibration.

It is still a further object of the present invention to provide an air gauge sensor that is stable.

It is yet a further object of the present invention to provide an air gauge sensor that is insensitive to ambient pressure changes.

These and other objects will become more readily apparent in view of the following more detailed description.

DETAILED DESCRIPTION OF THE PREFERRED EMBODIMENT

Figure 1:
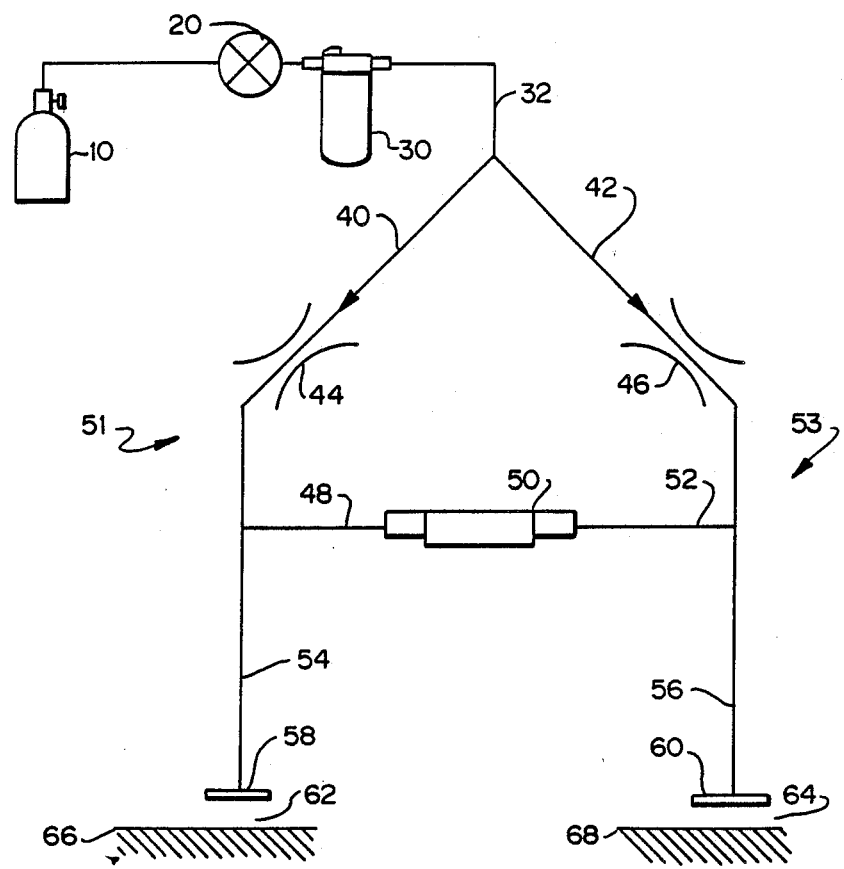
FIG. 1 is a mechanical schematic illustrating the invention.

FIG. 1 is a schematic illustrating the present invention. An air supply 10 provides pressurized air to a regulator 20. Filter 30 filters any impurities from the air before permitting it to enter air conduit 32. The filtered and regulated air after entering air conduit 32 divides into a first or measurement channel 40 and a second or reference channel 42. Each of the measurement and reference channels 40 and 42 have a first and second precision orifice or restrictor 44 and 46, respectively therein. The two orifices or restrictors 44 and 46 control the mass air flow through the channels 40 and 42. The restrictors 44 and 46 preferably restrict the mass air flow equally. This can be accomplished by a precision orifice of equal size being placed in each channel. The air flow in the measurement channel 40 is further divided at the first mass air flow channel 48. The remaining air flow precedes through the measurement probe channel 54 and out measurement probe 58. At this point the air is free to the ambient environment and fills the measured gap 62 between the measurement probe 58 and the surface 66. Analagously, the air flow in the reference channel 42 is divided between the reference mass air flow channel 52 and the reference probe channel 56. The air flow continues through reference probe channel 56 to reference probe 60. At reference probe 60 the air flow is free to the ambient environment. The air flow fills reference gap 64 between reference probe 60 and reference surface 68.

A mass air flow sensor 50 is positioned between the measurement leg 51 and the reference leg 53. Air is free to flow through mass air flow sensor 50. The mass air flow sensor 50 detects and measures the transfer of air mass between the measurement leg 51 and reference leg 53. One technique for measuring air flow is with a hot wire placed in the path of the air flow. This method uses the physical principle that the amount of heat transfer from a heated wire to the fluid surrounding it is proportional to the mass flow of the fluid across the wire. As the wire changes temperature due to the heat transfer, the resistance of the wire also changes and the resultant change in electrical current is measured through an electrical circuit. A commercially available mass air flow sensor is the microbridge AWM2000 distributed by Microswitch, a division of Honeywell Corp. When the measurement gap 62 is equal to the reference gap 64 there is no net mass air flow through sensor 50, provided the two precision orifices or restrictors 44 and 46 have the same resistance to air flow. Different size restrictors 44 and 46 can be used if the two gaps 61 and 64 are not the same in order to balance the pneumatic bridge air gauge sensor. In this way the bridge can be balanced even though the gaps 62 and 64 are not equal.

In operation, when gap 62 becomes greater than reference gap 64 the mass air flow moves from the reference mass air flow channel 52 through sensor 50 toward the measurement mass air flow channel 48. Mass air flow sensor 50 detects this movement and provides a signal indicitive of the widening of the gap 62. Likewise, when gap 62 decreases mass air flow is directed from the measured mass air flow channel 48 through sensor 50 toward reference mass air flow channel 52.

Any pneumatic noise in the system can be reduced by providing an initial air flow pressure sufficient to provide laminar and incompressible fluid flow. Additionally, channels having no irregularities, or sharp bends, or other obstructions help provide a smooth or laminar air flow further reducing the possibility of any pneumatic noise. The measurement probe and the reference probe exhausting to the same pressure, in most cases atmospheric, results in a negligible effect upon an ambient pressure change. Likewise, acoustic sound pressure levels will cancel, to the first order, in much the same way provided phase differences between the measurement probe and the reference probe are not too great. Higher orders of background noise can be reduced by common mode noise reduction. This is accomplished by providing a separate channel that is used to sample the background noise. The noise is then subtracted from the mixed noise and signal resulting in only the desired signal remaining.

Since the present invention relies on the mass air flow rather than a pressure measurement the amount of air that flows through the air gap changes in proportion to the deviation of the gap raised to the third power. Also, the change in flow is controlled by the speed of sound, the speed in which the change in flow resistance through the probe can be propagated upstream to the remainder of the pneumatic bridge. This is a faster response time than air gauges that measure pressure differential because in air pressure differential systems the pressure must integrate itself over the dead air volume of the system between the probes and the pressure sensor. Response times for the present invention are in the order of 10-15 msec whereas for a similar air gauge using a pressure differential system the response time will be in the order of 200-300 msec.

Figure 2:
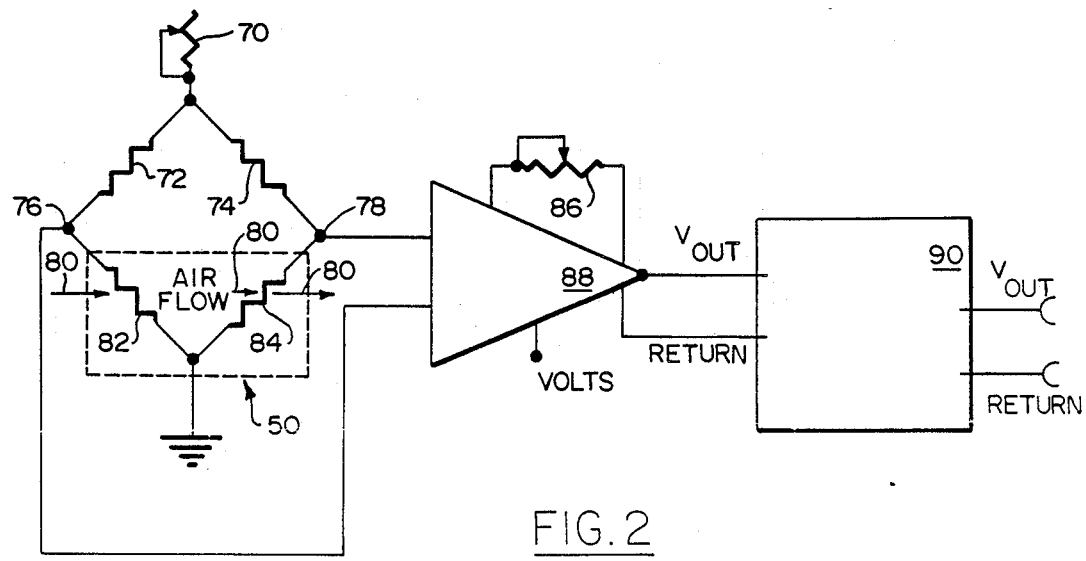
FIG. 2 is an electrical schematic illustrating a circuit for detecting the mass air flow.

FIG. 2 illustrates a circuit that can be used to provide a voltage output representative of gap 62 between the measurement probe 58 and surface 66 shown in FIG. 1. The mass air flow sensor 50 comprises a portion of a Wheatstone-like bridge. The bridge is formed by resistors 72, 74, 82, and 84. Resistors 82 and 84 are thermistors. A resistor made from material that has the property of changing electrical resistance as a function of temperature is a thermistor. When mass air flow represented by arrows 80 flows across the thermisters 82 and 84 the two thermisters 82 and 84 change resistance due to the heat transfer to the mass air flow. The voltage between a first node 76 and a second node 78 changes as a result of the change in resistance of thermisters 82 and 84. The output voltage of the bridge between the first and second nodes 76 and 78 can be offset slightly by the variable resistor 70.

The signal from first and second nodes 76 and 78 is amplified by amplifier 88. The gain of amplifier 88 can be adjusted by variable resistor 86. The output of the amplifier 88 can be conditioned by an optional electrical filter 90. The output can then be used to control other devices to take any desired action as a result of the changing gap distance 62 between the measurement probe 58 and the surface 66 illustrated in FIG. 1.

The desciption of air as a fluid used in the present invention is only the preferred fluid. It should be understood that any material can be used in the invention that has the properties of a fluid.

Although several embodiments have been illustrated and described, it will be obvious to those skilled in the art that various modifications may be made without departing from the spirit and scope of this invention.

What is claimed is:

1. An air gauge sensor having low volumetric air flow resulting in minimum influence on particulate contamination on a surface for detecting an air gap between two surfaces comprising:
   an air supply;
   regulator means, associated with said air supply, for regulating the air pressure supplied by said air supply;
   a filter through which air from said air supply flows;
   a conduit attached to one end of said filter;
   a junction dividing said conduit into a reference channel and a measurement channel;
   a restrictor placed in each of said references and measurement channels, said restrictors each having an orifice substantially the same size;
   a reference probe at the distal end of said reference channel forming a predetermined reference gap with a reference surface whereby air is released from said reference channel through the reference gap;
   a measurement probe at the distal end of said measurement channel forming a gap with a surface whereby air is released from said measurement channel through the gap; and
   mass air flow sensor means, coupled between said reference and measurement channels, for sensing the mass air flow therebetween, whereby there will be no mass air flow between said channels when said reference gap is equal to the gap.

* * * * *